Sept. 11, 1962 C. J. GORSICA 3,053,544
GASKET
Filed Oct. 24, 1958
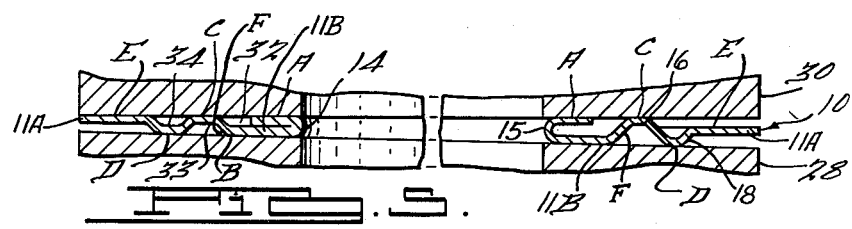
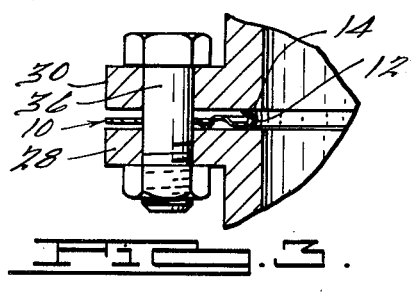
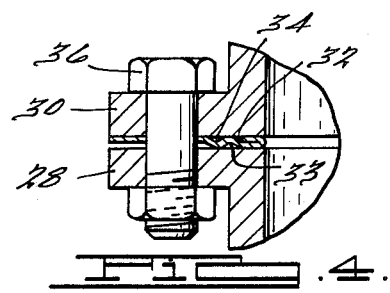
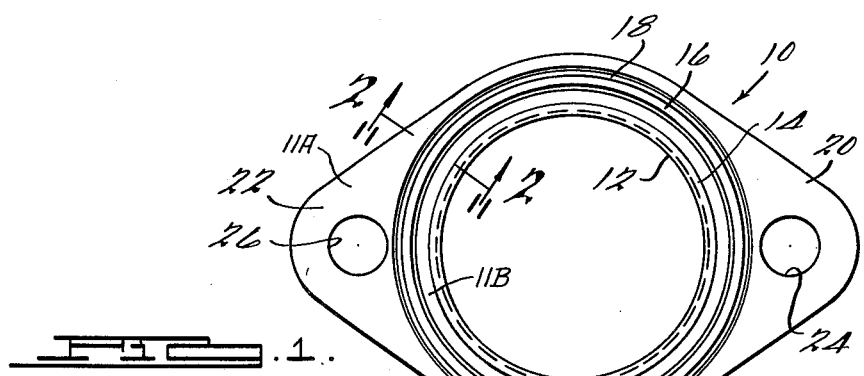
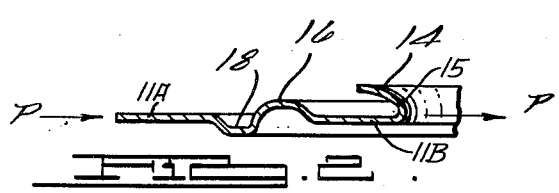
INVENTOR.
Chester J. Gorsica
BY Harness + Harris
ATTORNEYS.

United States Patent Office 3,053,544
Patented Sept. 11, 1962

3,053,544
GASKET
Chester J. Gorsica, East Detroit, Mich., assignor to Chrysler Corporation, Highland Park, Mich., a corporation of Delaware
Filed Oct. 24, 1958, Ser. No. 769,350
3 Claims. (Cl. 277—180)

This invention relates to a gasket for use between mating or sealing flanges of a pressurized system to create a fluid and/or gas tight seal therebetween under conditions of sustained heat and pressure.

This invention is particularly applicable in creating a seal between the exhaust manifold outlet flange and the exhaust pipe flange of an internal combustion engine wherein the exhaust gas pressure and heat are frequently sufficient to cause gas leakage and gas blowout past the gasket compressed between these flanges. Other applications of this gasket would include sealing of steam systems and combustion apparatus of both the gas and fluid types.

Heretofore, gaskets having a curled lip for bearing against the sealing flanges have been used, but the degree of compression of the lip and the uniformity of pressure on the periphery of the lip required for a lasting seal has been practically impossible to obtain by the normal installation procedures. Moreover, the sustained heating of the lip relieves it of its resiliency and results in the loss of the initial seal. A further disadvantage of the single lip is that production imperfections in the bearing surfaces of the flanges and/or pitting thereof due to exhaust gas heat presents leakage passages between the compressed lip and the pitted surfaces.

In gaskets which have used beads as the sealing element, unsatisfactory seals have been obtained as the result of the compression necessary to cause these beads to bear against the flanges to create a seal therebetween. This compression substantially flattens the beads, and when their resiliency is subsequently lost by sustained heating, the seal is also lost. Moreover, when employing beads alone as the sealing element, substantially uniform peripheral compression of the beads is necessary to obtain a seal.

It is an object therefore of this invention to provide a gasket for use as a sealing structure in high pressure and temperature gas systems, wherein said gasket has a curled lip and sealing beads adjacent thereto to continuously urge said lip into sealing contact with irregular surfaces of said system to provide a lasting resilient seal between said irregular surfaces.

A specific object of this invention is to provide a gasket having means thereon to form gas and/or fluid pockets of graduated pressure between sealing flanges of a pressurized system when said gasket is compressed between said flanges and to provide thereby heat insulators and to reduce gasket blow outs.

A further specific object of this invention is to provide a gasket having a curled sealing lip adapted for compression between mating flanges, and also having bead means adapted for compression to a resilient state by said flanges to create a force on said lip urging the same to an open position to maintain a tight gas and/or fluid seal between said lip and said flanges.

Further objects and advantages will become apparent from the following description and drawings, in which:

FIGURE 1 represents a top elevational view of a gasket;

FIGURE 2 represents a cross sectional view of the gasket of FIGURE 1 taken along the line 2—2 thereof in the direction of the arrows;

FIGURE 3 represents a cross sectional flange-gasket assembly before compression;

FIGURE 4 represents a cross sectional flange-gasket assembly after compression; and FIGURE 5 represents a cross sectional flange-gasket assembly under non-uniform peripheral compression.

In FIGURES 1 and 2 of the drawing is shown a gasket 10 comprising a relatively flat sheet-like body 11 of resilient, heat resistant material having substantially coplanar outer and inner portions 11A and 11B respectively. The said inner portion of the body 11 is provided with an aperture 12 rimmed by a sealing lip 14 spaced from the body portion 11B and connected thereto by a fold 15 and between the said outer and inner body portions and surrounding the lip 14 the body 11 is reversely formed with sealing beads 16 and 18. In the form of gasket shown, for use in sealing the exhaust manifold flange 30 of an automotive vehicle engine to the exhaust pipe flange thereof, bolt flanges 20 and 22 are provided by the outer portion 11A of the body 11 of the gasket and have suitable bolt receiving apertures 24 and 26 therein respectively. It is obvious, however, that several bolt flanges and bolt receiving apertures, and also several fluid apertures could be provided for different applications of the gasket.

It is seen from FIGURES 2 and 3 that lip 14 and bead 16 lie on the same side of the plane P of the body portions 11A and 11B of the gasket in FIGURE 2 while bead 18 lies on the opposite side of plane P. This reverse type of beading provides a greater degree of compressibility of the gasket and allows a greater leeway in non-uniformity of peripheral mating of the flanges without losing the effective gasket seal therebetween. Such is demonstrated in FIGURE 5 wherein the right hand side of the gasket 10 contacts the mating flanges 28 and 30 at four points A, B, C, and D provided respectively by the lip 14, the body portion 11B, the bead 16 and the bead 18 with a loss only of contact point E even though the flanges 28 and 30 are substantially more closely mated on the left side than on the right. The total distance between the base of the bead 18 and the top of lip 14 is sufficient to allow for any normal variation in peripheral flange spacing due to either/or warping, pitting, uneven compressing, and manufacturing defects of the flanges and still create several points of sealing contact between the gasket and the flanges.

Referring to FIGURES 4 and 5 it is seen that air spaces 32, 33 and 34 are formed between the gasket and the flanges when said flanges are drawn together by bolts 36. These air spaces serve as heat insulators to reduce the amount of heat dissipated to surrounding structures such as the engine block and floor boards in automotive installations. These air spaces further serve as pressure chambers wherein the pressure is highest in 32 and lowest in 34. This graduation in pressure drop across the exhaust system reduces considerably the possibility of blow outs past all of the contact surfaces A, B, C, D, and E.

In the compression of gasket 10, the double thickness provided by body portion 11B and lip 14 prevents the beads 16 and 18 from being permanently deformed to such a degree that they lose all of their inherent resiliency, and even after sustained heating of the gasket the contact surface C of bead 16 exert a force on the gasket portion F tending to rotate it downwardly about fulcrum point B and tending to rotate the compressed lip 14 upwardly to maintain thereby a tight seal at points A and B as well as tight seals at C, D, and E.

I claim:

1. A gasket comprising a substantially flat sheet-like body of resilient material, an aperture in said body defined by a reversely curled lip thereof having its edge portion overlying and spaced from said body, a first bead on said body surrounding said lip and extending outwardly from said body to a lesser degree than said edge portion of said lip, and a second bead on said body surrounding said first bead and extending outwardly from said body in an opposite direction from said first bead, the distance from the top of said one bead to the bottom of said second bead being greater than twice the thickness of said material of said sheet-like body.

2. A gasket comprising a substantially flat sheet-like body of deformable resilient material, an aperture in said body defined by a reversely curled lip thereof having its edge portion overlying and spaced outwardly from one side of said body, a first bead on said body surrounding said lip and extending outwardly from said one side of said body to a lesser extent than said lip edge portion, and a second bead on said body surrounding said first bead and extending outwardly from the other side of said body, said beads and said lip being substantially concentric, said beads having a common portion in the plane of said body and the distance from the top of said first bead to the bottom of said second bead being greater than twice the thickness of said material of said sheet-like body.

3. A heat insulating and pressure retaining seal assembly comprising opposing flanges between which a seal is to be made and a gasket comprising a body of resilient sheet-like material secured under compression between said flanges, said gasket having an apertured portion abutting said flanges and defined by a reversely curled lip of said body which lip has its edge portion overlying said body, a first bead on said body surrounding said apertured portion and extending outwardly from one surface of said body and abutting one of said flanges and a second bead surrounding said first bead and extending outwardly from the surface of said body and abutting the other of said flanges, said beads together with said lip forming a plurality of radially spaced annular heat insulating spaces between said flanges and said lip and beads being under compression whereby a tight seal is affected at each thereof, the said lip prior to compression being spaced from said body a greater distance than said beads and the distance from the top of said one bead to the bottom of said second bead prior to compression being greater than twice the thickness of said sheet-like material and said first bead when under compression exerting a rotating force on said gasket urging said lip into tight sealing contact with said flanges.

References Cited in the file of this patent

UNITED STATES PATENTS

| | | |
|---|---|---|
| 222,388 | Doty | Dec. 9, 1879 |
| 1,050,132 | Haynes | Jan. 14, 1913 |
| 1,863,893 | Bailey | June 21, 1932 |